1,737,069

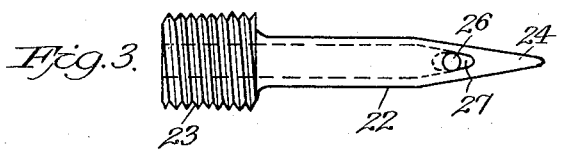
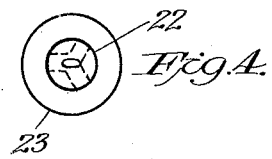
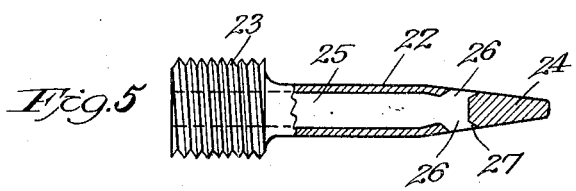
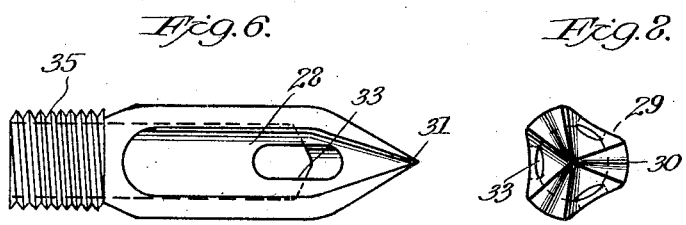
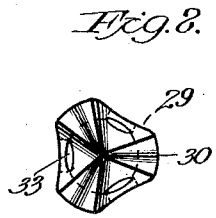
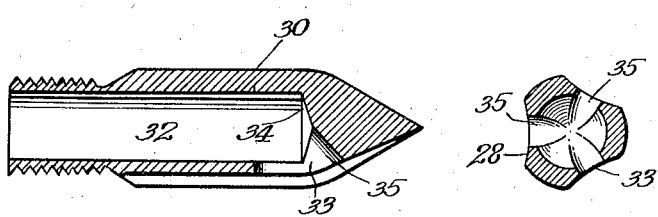
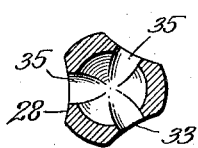
Inventor
George G. Barber, Patented Nov. 26, 1929

UNITED STATES PATENT OFFICE

GEORGE G. BARBER, OF NEW YORK, N. Y., ASSIGNOR TO CONTINENTAL BAKING COMPANY, OF WILMINGTON, DELAWARE, A CORPORATION OF DELAWARE

PASTRY-FILLING MACHINE

Application filed December 15, 1926. Serial No. 155,040.

This invention relates to new and useful improvements in machines for inserting filling material into articles such as cream puffs, doughnuts, and other confections.

An important object of this invention resides in the provision of a machine of this character which is automatic in its operation and will, therefore, greatly increase production of such articles.

Another important object is to provide a machine having conveying means which carry the articles to a point where filling material is inserted into the articles and also serves to conduct the filling material into the articles.

A further important object of the invention is to provide means for automatically removing or stripping the articles from the conveying means after the filling material has been inserted therein.

A still further important object of the invention resides in providing a filling material passage which offers the least resistance to the material passing therethrough in order to enhance the quality of the filling material.

Another important object of the invention resides in the provision of means which will insure a uniform flow of the filling material in the apparatus and which will also insure a uniform quality or texture of the filling material.

A further object of the invention resides in the provision of a machine of the above character which is of simple construction and, therefore, easily manufactured or repaired, and one including an arrangement and construction of parts which will facilitate cleaning and maintaining the machine in a highly sanitary condition.

Other objects and advantages of the invention will become apparent during the course of the following description:

Referring to the drawings, wherein like numerals are employed to designate like parts throughout the several views;

Figure 3 is a side elevation of one form of filling tube or nozzle.

Figure 4 is an end elevation thereof.

Figure 5 is a fragmentary longitudinal section of this nozzle.

Figure 6 is a side elevation of a modified form of filling nozzle.

Figure 7 is a longitudinal section of the same.

Figure 8 is an end elevation of Figure 6, and

Figure 9 is a transverse section of the nozzle.

Figure 1:
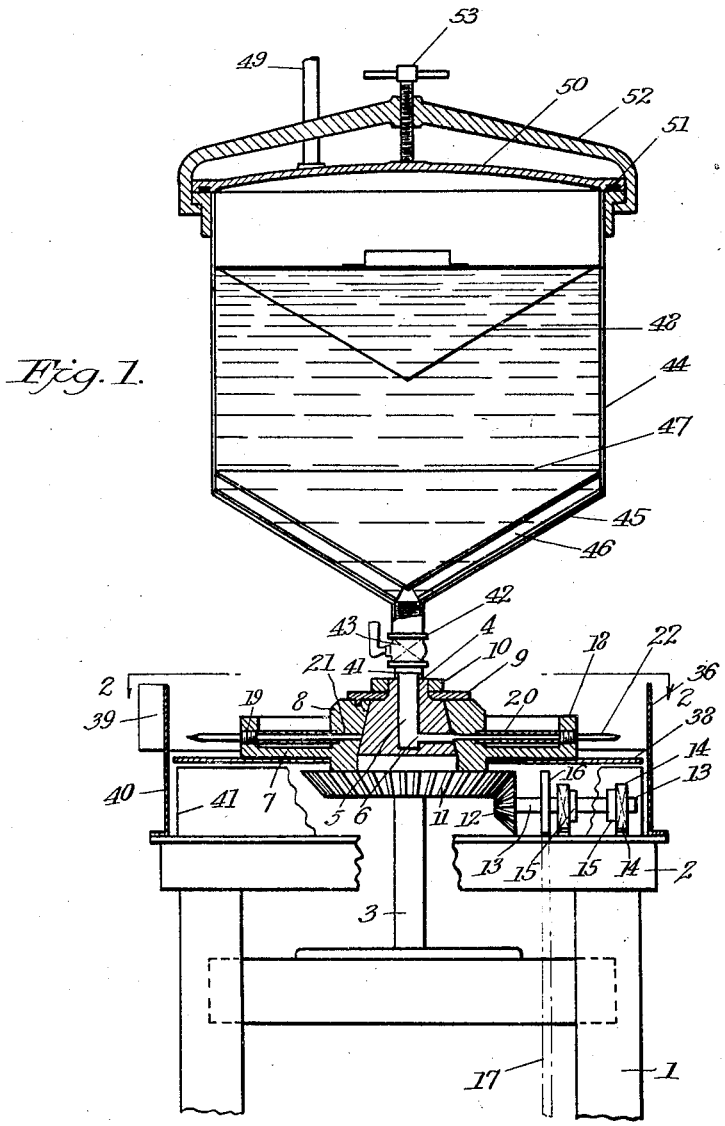
Figure 1 is a fragmentary vertical section of the machine.
Figure 2:
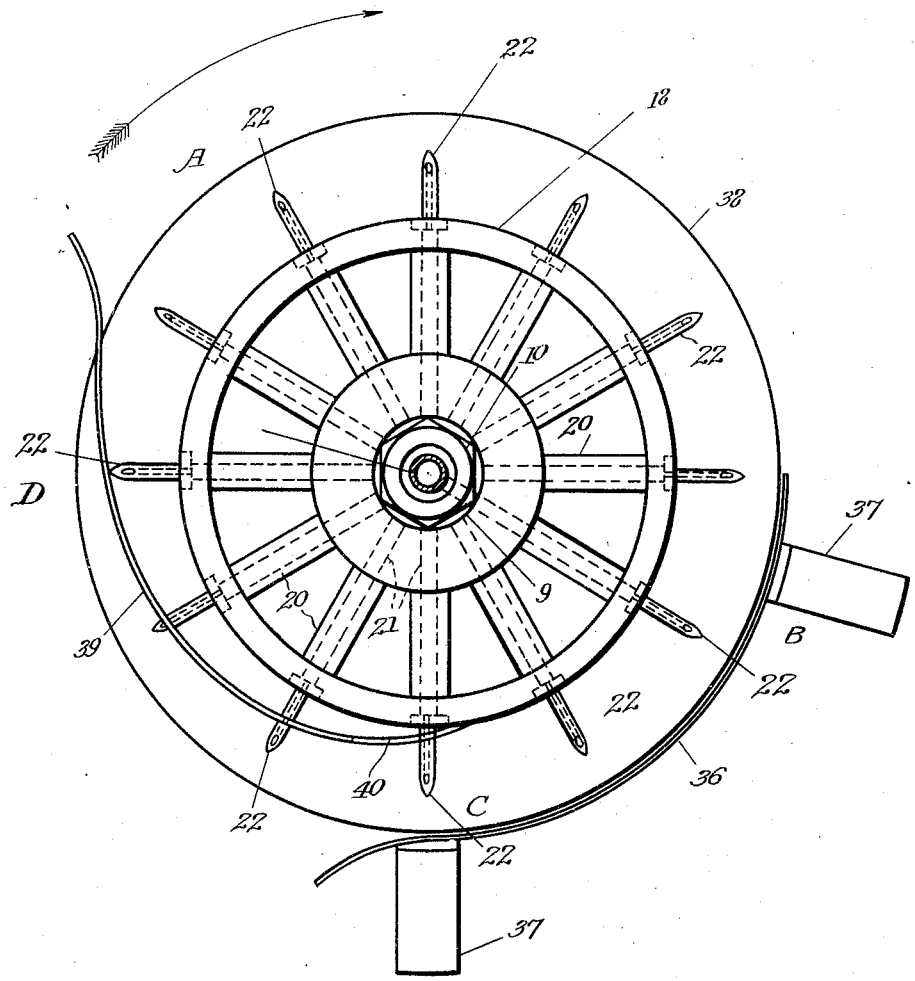
Figure 2 is a horizontal section of the same taken on the line 2—2 of Figure 1.

The machine may be broadly described as having an endless article conveyor having supports for the articles which serve to conduct filling material into the articles and also serve to convey the articles from a loading station A, shown in Figure 2, to a filling station B where the filling material is inserted in the articles, and subsequently convey the filled articles to an unloading or stripping station D.

In the embodiment of the machine illustrated herein I have shown one which is particularly adapted for inserting filling into cream puffs or doughnuts, but I desire it distinctly understood that I do not confine the use of the machine to these particular articles, as it is obvious that it may be employed with equal facility to many other articles.

Referring now particularly to the drawings, the numeral 1 designates a suitable frame work having a platform 2 on which various parts of the machine are mounted. An upright element 3 extends from the frame work to a point above the platform to support a stationary valve element 4 which is substantially frustro-conical to provide converging side walls for a purpose which will presently appear. This supporting valve element is provided with an axial vertical passage 5 which terminates at its lower end, adjacent the bottom of the element, in a laterally extending branch passage 6 which opens out into the periphery of the valve element.

Conveying means in the form of a circular carrier 7 is provided with a hub portion 8 which is rotatably mounted upon the valve element 4 and is held in place thereon by a lock washer 9 fitting over the reduced upper end of the valve element and secured by means of a lock nut 10 screwed upon the reduced upper end of the valve element.

In order to rotate the carrier 7, a ring gear 11 is secured to the hub portion and meshes with a beveled pinion 12 secured to a horizontal drive shaft 13 mounted in suitable spaced bearings 14 mounted on the platform 2. The drive shaft 13 is prevented from endwise movement in its bearings by means of thrust washers 15, as shown. Rotary movement is transmitted to the drive shaft by means of a sprocket 16 keyed thereto being driven by a sprocket chain 17 which derives its power from any suitable source, not shown.

The outer edge of the rotary carrier 7 is provided with an annular upstanding flange 18 having at spaced intervals circumferentially thereof, a plurality of openings 19 which support the outer ends of filling material conducting tubes 20, the inner ends of these tubes which extend radially of the hub being secured to the periphery of the hub 8 by screw threads or any other suitable means. The bores of these tubes 20 align with radial conduits 21 in the hub 8, which conduits open into the inner periphery of the hub in the same plane with the branch passage 6 of the valve element 4, so that during rotation of the carrier, its conduits 21 will successively register with the branch passage 6.

In order to support the articles upon the carrier 7 an impaling tube or nozzle 22 of either of the types shown in Figures 3 or 6, is secured in each of the openings 19 of the flange 18, and this is preferably accomplished by providing each of the tubes or nozzles with a threaded extremity 23 and screwing it into its respective opening 19. These impaling or filling nozzles 22 extend radially from the annular flange 18 a substantial distance in spaced circumferential relationship in order that articles may be pushed onto these nozzles and retained thereon while they are being conveyed from one station to another.

I have disclosed two different types of impaling nozzles, one being disclosed in Figures 3 to 5 inclusive, and which is employed for filling doughnuts, and the type shown in Figures 6 to 9 inclusive is employed for filling cream puffs. The type shown in Figure 3 consists of a tube 22 having an enlarged exteriorly threaded inner extremity 23 and a tapered outer extremity 24 which is substantially flat as shown best in Figure 4. The passage 25 through the nozzle extends longitudinally thereof and has its outer end terminating in outlet orifices 26 arranged upon opposite sides of the tapered end 24. It will be observed that the outer ends of these orifices are slightly enlarged as at 27 to facilitate the admission of the filling material into the article being filled.

The form of impaling nozzle disclosed in Figures 6 to 9 is a tubular element 28 having an exterior non-circular surface, rendering the tube substantially hexagonal in cross section, three of the sides 29 thereof being slightly concaved while the other three sides 30 thereof are substantially convex and are alternately arranged with the concave sides 29. The outer extremity of this nozzle tapers into a penetrating point 31 having the same external configuration as the body of the nozzle. The bore 32 of this nozzle terminates slightly in arrears of the tapered end and communicates with the three outlet slots 33 extending lengthwise of the nozzle. In order to facilitate the flow of the filling material through these slots, the end wall 34 of the bore 32 is provided with three grooves 35 which are inclined outwardly and in the direction of the penetrating point 31. It will be observed that the outlet slots 33 are provided in the concave surfaces 29 of the nozzle and due to this arrangement an unobstructed flow of the filling material is obtained since the side edges of the concave portions 29 retain material from which the articles are made out of contact with the slots 33. As in the preceding type of nozzle, this one is also provided with an exteriorly threaded terminal 35 for attachment in the threaded portion of the opening 19 of the carrier.

In order to retain the articles upon the impaling nozzles 22 while they are being conveyed from the loading station A to the filling station B and initial unloading station C, an arcuate vertical guide plate 36 is secured in concentric relation and spaced from the free ends of the impaling nozzles by means of supporting braces 37 secured to the platform 2. A portion of the guide 36 is, of course, opposite each impaling nozzle 22 which reaches the filling station B in order to prevent displacement of the articles from the impaling nozzles which might be caused by the pressure under which the filling material is forced through the nozzles at this point.

The carrier 7 has the circular plate 38 secured to its under side and which extends a substantial distance beyond the outer periphery of the carrier flange 18 and beneath the impaling nozzles to serve as an additional support for the articles pierced by the nozzles. This plate, however, is only used when filling cream puffs in order to properly support them and prevent breakage of the crisp dough shells.

To automatically strip the articles from the impaling nozzles after they have been filled at the filling station B, a stripping plate 39 is supported adjacent the unloading station D by means of leg extensions or braces 40 secured to the platform 2. This stripping plate 39 is arcuate and its primary essential is that it diverge from the path of movement of the free ends of the impaling nozzles so that the articles on these nozzles will be removed therefrom as the nozzles gradually recede from the stripping plate. In the present instance, this stripping plate is provided with a slot into and out of which, the nozzles may travel to strip the articles therefrom. It will be observed that its inner end is substantially tangential to the carrier flange 18 and that a portion of the plate above the slot is removed as at 40 to permit entrance of the nozzles or tubes into the slot.

A sectional drip pan 41 is placed beneath the rotating carrier and horizontal guide plate 38 to catch drippings from the nozzles, especially whenever they are removed for cleaning purposes.

In order to provide for a constant source of supply of filling material for the passage 5 of the valve element 4, the latter is provided with an upward tubular extension 41 which is connected to the outlet spout 42 of a filling material reservoir by a valve 43 by which the flow of material to the passage 5 may be controlled. The reservoir 44 for the filling material is provided with a conical bottom 45 which terminates in the outlet spout 42. A plurality of angle supports 46 are secured to this conical bottom to support a conical strainer 47 in spaced relation thereto so that the filling material passing through the strainer will have unobstructed passage to the outlet nozzle.

A floating plunger 48 is provided for the reservoir to assist in expelling the filling material therefrom which is assisted by any type of pressure, but preferably by air under pressure admitted to the reservoir through the pipe 49 opening through the removable top 50 of the reservoir. This cover 50 is provided with a gasket 51 in order to make an air-tight connection with the top of the reservoir and this connection is further maintained by a suitable clamp 52 engaging the flanged top of the reservoir and having a screw 53 engaging the cover 50 for placing the latter into fluid-tight engagement with the upper edge of the reservoir.

In operation it will be seen that air under pressure entering the reservoir will force the plunger 48 downwardly to expel the filling material therein through the outlet spout 42 and into the passage 5 of the valve element 4 as well as its branch passage 6 ready to be expelled through the first conduit 21 of the rotary carrier which comes into registry therewith. An operator standing at the loading station A within reach of several of the impaling nozzles, places the articles upon the impaling nozzles by piercing the articles therewith, and the carrier 7 successively conveys the articles to the filling station B at which time the conduits 21 register with the branch passage 6 of the valve element 4 permitting the filling material to flow through the tube 20 and impaling nozzle and through its outlets into the article. By the speed of rotation of the carrier, the quantity of filling material inserted into each article is governed, and only a short time elapses before the conduits 21 and branch passage 6 are withdrawn from alignment and the flow of filling material is cut off. It will, of course, be apparent that the guide plates 36 and 38 prevent displacement of the articles from the nozzles as they are being conveyed to and from the filling station, although, of course, it will be obvious that either or both plates may be eliminated when the character of the article to be filled permits.

After the filled articles have passed the filling station they encounter the inner end of the stripping plate 39 at the point C where the nozzles are guided into the slot of the stripping plate and since it diverges from the periphery of the carrier, it will be obvious that the articles are pushed off of the impaling nozzles as they approach the point E where the nozzles withdraw from the slot and are freed from the articles ready to receive others at the loading station.

As indicated previously, various types of impaling nozzles may be employed in conjunction with this invention, but I have illustrated two types which have proven extremely desirable for the two types of pastry which are disclosed as being finished with my present improvements. Partitcular attention is called to the type disclosed in Figures 6 to 9 inclusive which has proven very desirable for filling cream puffs which, as well known, consist of rather fragile hollow shells or containers for the cream, and unless supported in a proper manner are very apt to break. The nozzle 28 has a non-circular cross section in order to prevent the shells from turning thereon and it also has the somewhat ridged configuration to facilitate penetration of the hollow articles by the nozzles as well as to keep the shell out of contact with the outlet passages so that an unobstructed flow of the cream will be accomplished.

It is to be understood that various changes in the size, shape or arrangement of parts may be resorted to without departing from the spirit of the invention or the scope of the appended claims.

I claim:

1. A pastry filling machine comprising a filling station, substantially horizontal conveying means to carry articles thereto including piercing points by which the articles are punctured and their weight solely supported and which serve to convey filling material to said articles.

2. A pastry filling machine comprising a filling station, article puncturing, filling and supporting means movable to said filling station and including a piercing point by which the article is punctured, and means operative upon arrival of said puncturing means at said filling station to permit the filling material to flow through said puncturing means and to enter said articles.

3. A pastry filling machine comprising a stationary member having a passage for fluent material, a carrier rotatably associated therewith and having a conduit adapted to be registered with said passage, and an article puncturing, filling and supporting element associated with said carrier and adapted to convey material from said conduit into an article on said puncturing element when the passage and conduit are in registry, said article puncturing means being pointed and forming the sole support of the weight of said articles.

4. A pastry filling machine comprising filling and unloading stations, puncturing means for conveying articles from one to the other and serving to convey filling material into said articles at said filling station, and means for removing said articles from said puncturing means at the unloading station.

5. A pastry filling machine comprising filling and unloading stations, impaling means for conveying articles from one to the other and serving to convey filling material into said articles at said filling station, and means diverging from said conveyor means for stripping the articles from said impaling means.

6. A pastry filling machine comprising rotary means, material conducting and impaling means carried thereby and serving to convey the material into articles placed on the impaling means, and article stripping means diverging from said rotary means and having a slot through which the impaling means are carried to strip the articles therefrom.

7. A pastry filling machine comprising a filling station, movable article puncturing nozzles for conveying articles to said filling station, and stationary means arranged to engage said articles for retaining them upon said nozzles.

8. A pastry filling machine comprising a rotary carrier, material conducting and impaling means extending from the periphery thereof and serving to convey material into articles impaled thereon, and an arcuate plate adjacent said carrier for retaining the articles upon said impaling means.

9. A pastry filling machine comprising a filling station, article penetrating means for conveying articles to said station and serving to convey material to said articles when they reach said filling station, means for retaining said articles upon said penetrating means until they arrive at said station, and means for stripping said articles from said penetrating means after they pass said station.

10. A pastry filling machine comprising a valve member, a material reservoir communicating therewith, strainer means in said reservoir, a floating plunger therein, means for admitting a medium under pressure to said reservoir, and a plurality of impaling nozzles adapted to successively cooperate with said valve member and serving to convey the material under pressure to articles impaled thereon.

11. A pastry filling machine comprising filling and unloading stations, means for conveying articles from one to the other and serving to convey filling material into said articles at said filling station, and means for removing said articles from said first mentioned means at the unloading station.

12. A pastry filling machine comprising a rotary disc, material conducting and impaling nozzles projecting radially from the periphery thereof and serving to convey material into articles placed on said nozzles, and a stationary arcuate member arranged substantially tangent to the periphery of said disc and arranged in proximity to the path of movement of said nozzles for stripping the articles therefrom.

13. A pastry filling machine comprising a carrier movable in an endless path, a substantially horizontal article puncturing and conveying nozzle extending from said carrier, and a plate immovably secured to said carrier and extended beneath said nozzle to engage and support an article on said nozzle.

14. A pastry filling machine comprising a rotary carrier, material conducting and impaling means extending from the periphery thereof and serving to convey material into articles impaled thereon, and a vertical arcuate plate concentric with said rotary carrier and arranged outwardly from the free ends of said impaling means for retaining articles thereon.

15. A pastry filling machine comprising a rotary carrier, material conducting and impaling means extending substantially horizontally from the periphery thereof and serving to convey material into articles impaled thereon, a support for said articles secured to said carrier and disposed beneath said impaling means, and stationary means arranged beyond said impaling means to engage articles for retaining them upon said impaling means.

In testimony whereof I have hereunto set my hand.

GEORGE G. BARBER.